Patented Apr. 1, 1952

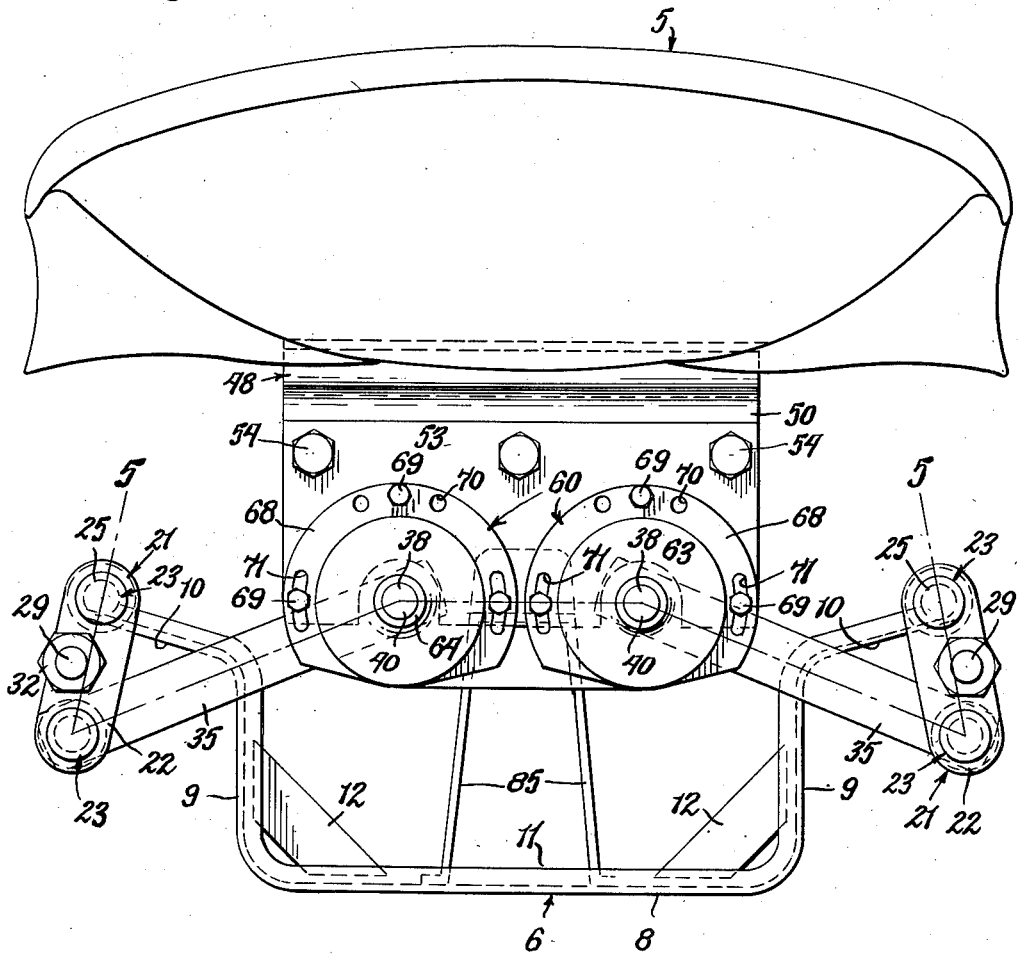

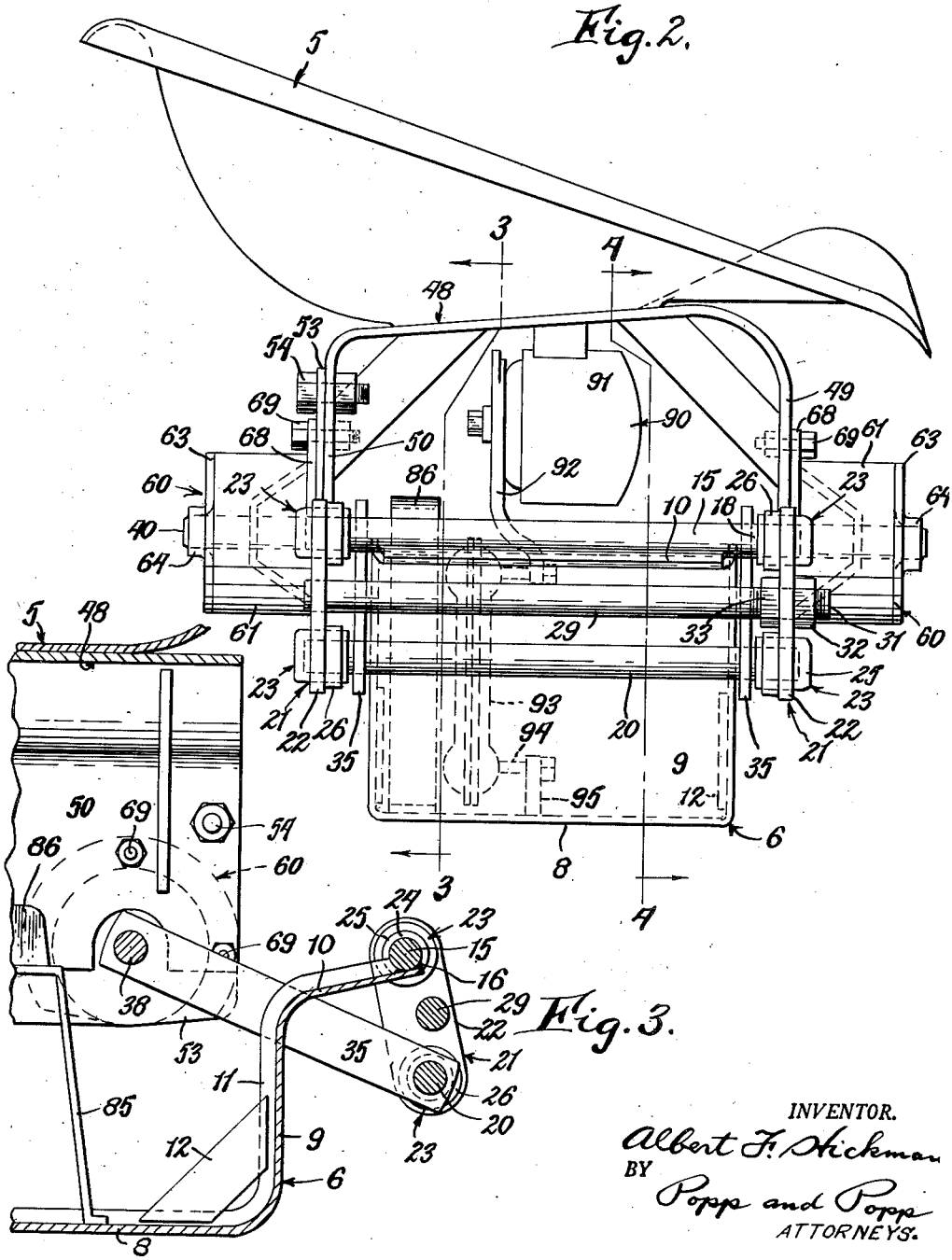

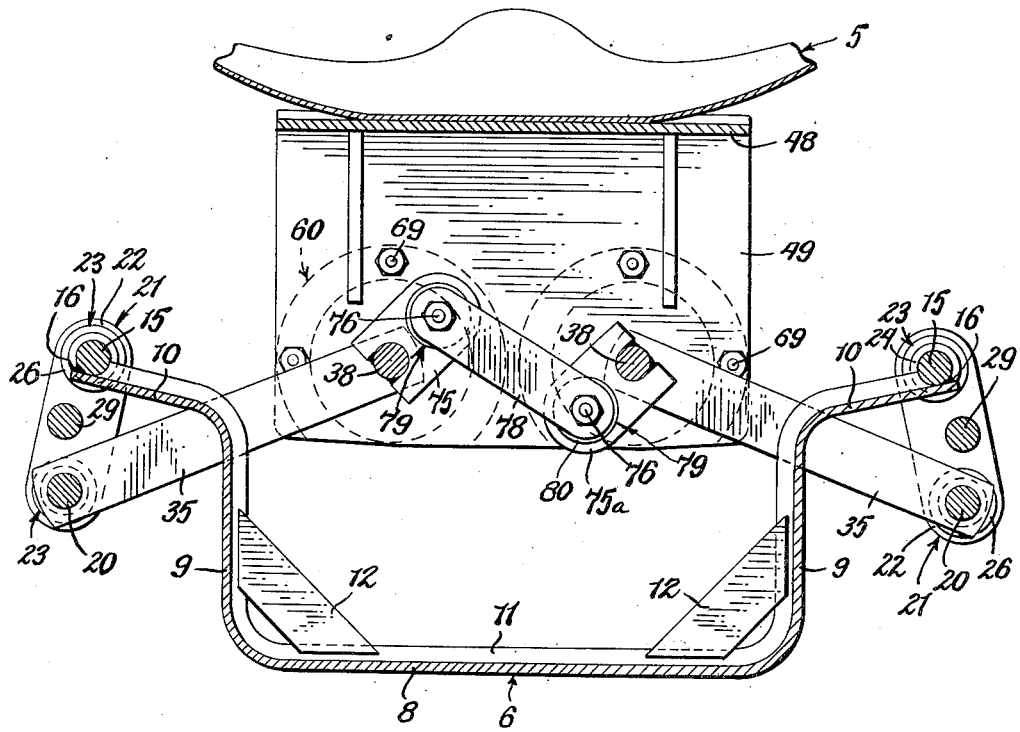

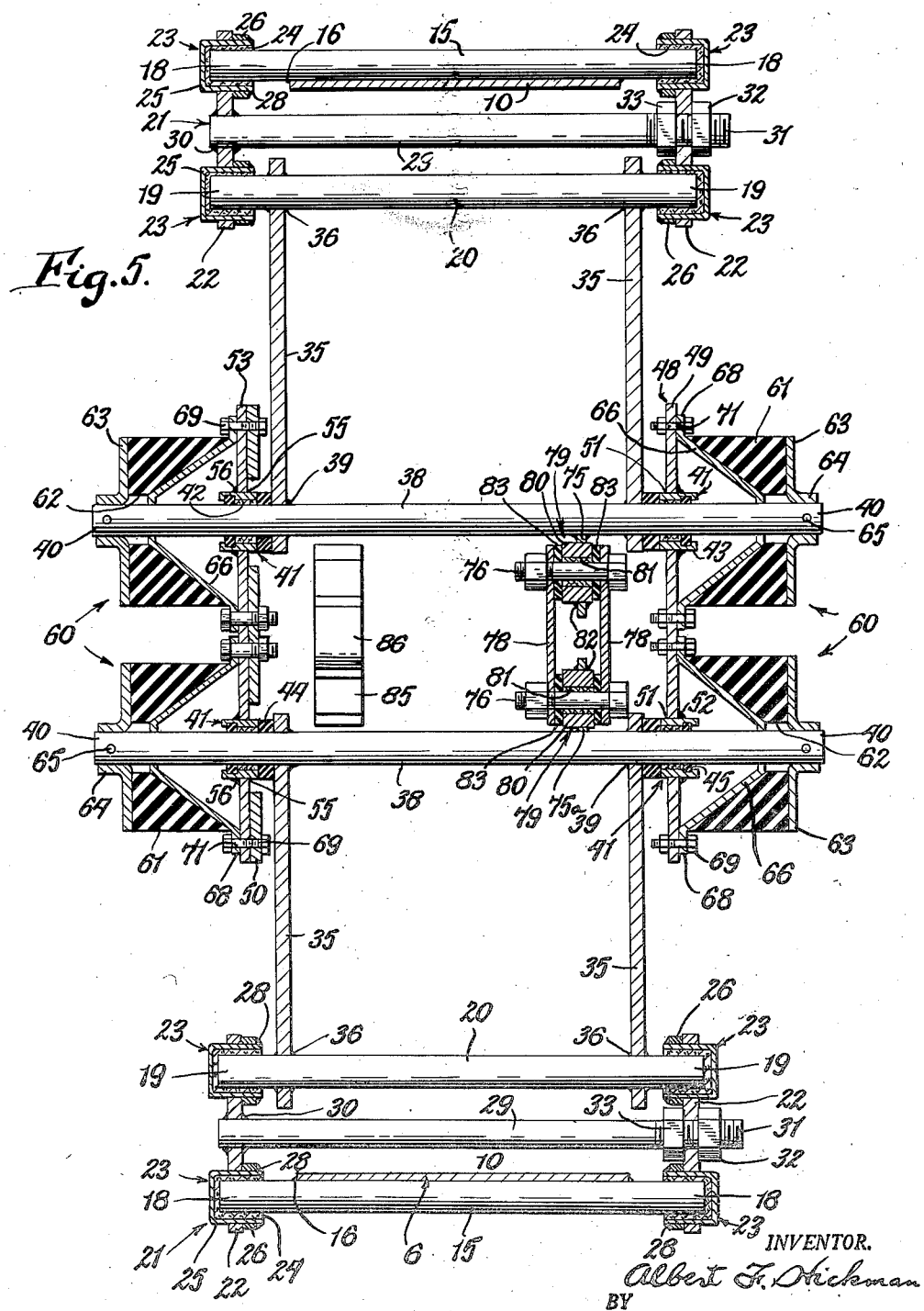

2,590,859

UNITED STATES PATENT OFFICE 2,590,859

RESILIENT SEAT SUSPENSION

Albert F. Hickman, Eden, N. Y., assignor to Hickman Industries, Inc., Eden, N. Y., a corporation of New York Application May 8, 1947, Serial No. 746,678

14 Claims. (Cl. 155—50)

This invention relates to a resilient seat suspension and more particularly to such a seat suspension designed for use with extremely rough riding vehicles such as farm tractors and military vehicles, the seat suspension also being applicable for use in railroad locomotives.

One of the principal objects of the invention is to provide such a seat suspension in which the seat part is permitted to move against a geometric resilient resistance, both laterally and vertically, relative to the vehicle on which the seat is mounted.

Another object is to provide such a seat suspension which provides the maximum safety and comfort and leaves the occupant in full control of all control levers and wheels of the vehicle.

Another object is to provide such a seat suspension in which the seat moves with the occupant and is not drawn or jerked away from the occupant whenever the pressure imposed by the occupant upon the seat becomes negative.

Another object is to provide such a seat structure which will operate in a desirable frequency range regardless of the weight of the occupant.

Another object is to provide such a seat suspension which can readily be designed, within practicable limits, to have any desired frequency and any desired resistance curve.

Another object is to provide such a seat suspension which reduces and cushions both the vertical and lateral impacts from the vehicle against the seat and its occupant without imposing undue thrusts on the pivotal connections which connect the seat part with the vehicle.

Another object is to provide such a seat suspension in which torsion springs are employed to provide a longer and variable spring resistance range.

Another object is to provide such a seat suspension in which the resilient support is provided by rubber torsion springs which are simple, compact and low in cost and will have long life and freedom from service difficulties.

Another object is to provide such a seat suspension including such rubber torsion springs in which the rubber torsion springs have a simple mounting on the seat part of the seat structure and have a simple and direct connection with the linkage connecting the base part with this seat part.

Another object is to provide such a seat suspension in which geometric resilient resistance is obtained in a compact structure which requires no lubrication and is free from squeaks and other noises.

Another object is to provide such a seat suspension in which the load from the seat to the suspension and from the suspension to the base is distributed at a plurality of spaced points.

Another object is to provide such a seat suspension in which both fore-and-aft and lateral tilting of the seat is prevented.

Another object is to provide a seat structure including a base part, seat part and resilient suspension therebetween which is made of a plurality of low cost and sturdy sub-assemblies which can be easily coupled together.

Another object is to provide a simple and low cost shackle structure as part of the suspension.

Another object is to provide such a seat structure which is extremely compact and sturdy and which will stand up under conditions of severe and constant use with very little servicing.

Other objects and advantages will appear from the following description and drawings in which Fig. 1 is a rear elevational view of a seat structure having a suspension embodying the present invention.

Fig. 2 is a side elevational view thereof.

Figs. 3 and 4 are fragmentary transverse sectional views taken on the correspondingly numbered lines on Fig. 2.

Fig. 5 is a laid out sectional view taken generally on line 5—5, Fig. 1.

The seat suspension embodying the present invention is designed primarily for use where rough riding or extreme lateral sidesway conditions are encountered, such as with farm tractors, railroad locomotives and military vehicles, where lateral as well as vertical stability is required and to this end the seat 5 is shown as being in the form of a sheet metal bucket type of seat or saddle and as carried by a base 6 which is adapted to be secured to the farm tractor or other vehicle on which the seat is used. This base 6 is shown as being in the form of a piece of sheet metal bent to provide a generally rectangular bottom 8, side walls 9 rising from the sides of the bottom 8, side flanges 10 inclining upwardly and outwardly from the upper extremities of the side walls 9 and reinforcing flanges 11 along its front and rear edges. Along the bottom 8 and side flanges 10 these front and rear flanges 11 project upwardly and along the side walls 9 these front and rear flanges 11 project in opposed relation to each other and the side walls 9 are shown as reinforced at each corner of the base by diagonal metal braces 12 which are suitably welded to the portions of the front and rear flanges extending along the bottom 8 and side walls 9.

The extremities of the front and rear flanges 11 are cut to provide quarter round seats for a pair of fore-and-aft base rods 15, each of which extends along the top of the outer extremity of the corresponding side flange 10 and is welded thereto as indicated at 16. The ends 18 of these base rods 15 project from opposite ends of the side flanges 10 to provide base pivot pins 18 projecting fore-and-aft from the four corners of the base 6.

It will be noted that each fulcrum rod 38 is welded to its crank arms 35 which are in turn welded to the corresponding rod 20 to provide a rectangular box yoke having high strength with the use of light materials.

At each side of the seat structure these base pivot pins are connected to parallel crank arm pivot pins 19 formed by the projecting ends of a crank arm rod 20 of a shackle structure indicated generally at 21. This shackle structure includes a pair of shackles 22 which are apertured at their opposite ends to receive bearings 23, each of which is shown as comprising a cup-shaped bushing 24 of lubricant impregnated sintered metal contained in a cup-shaped sheet metal shell 25 provided with a metal ring 26 which is press fitted or welded, as indicated at 28, to its periphery adjacent its rim. The shells 25 of these bearings are fitted into the apertures at the ends of the shackles 22. Each shackle is centrally apertured to receive a tie rod 29 which forms a part of each shackle structure 21. One end of each tie rod 29 is welded to the corresponding shackle 22 as indicated at 30 and the opposite end is threaded, as indicated at 31, and is secured to the opposite shackle 22 by a pair of nuts 32 and 33. It will be seen that each shackle structure 21 can readily be detached from the ends of the rods 15 and 20 which it connects by removing the outer nut 32, this permitting removal of the adjacent shackle 22 and also permitting withdrawal of the opposite shackle 22 together with the tie rod 29. It will further be seen that the inner nut 33 provides for adjustment of the thrust faces of the bearing bushings 24 against the ends of the pivot pins 18 and 19.

Each crank arm rod 20 which forms these pivot pins 19 extends through apertures in the outer ends of a pair of spaced crank arms or levers 35 and is welded thereto as indicated at 36. At each side of the seat structure the corresponding pair of crank arms are apertured at their inner ends to receive a fulcrum rod 38, these arms being welded to each fulcrum rod as indicated at 39. The opposite ends of these fulcrum rods project beyond the crank arms 35 to provide fulcrum pivot pins 40, each of which is journaled in a bearing 41.

The four bearings 41 are alike in construction, each being shown as comprising a bearing bushing 42 of lubricant impregnated sintered metal contained in a cylindrical metal shell 43, an annular rubber dust seal 44 being shown as interposed between each crank arm 35 and the adjacent end of the corresponding bearing 41 and an annular rubber dust seal 45 being shown as fitted in the opposite end of each metal shell 43 against its bearing bushing 42.

The metal shell 43 of each of these bearings 41 is connected to the sheet metal bucket seat 5 by means which are preferably constructed as follows:

The numeral 48 represents an inverted U-shaped supporting plate, the central cross part of which is suitably secured to the underside of the sheet metal bucket seat or saddle 5 and which has a depending front flange 49 and a depending rear flange 50. The front flange 49 is of substantially greater depth than the rear flange 50 and is provided in a horizontal plane with a pair of apertures 51 in which the shells 43 of the front pair of bearings 41 are fitted, and secured in any suitable manner as by the welds 52. A vertical plate 53 is removably secured to the relatively short rear flange as by bolts 54 and this plate in turn is provided in a horizontal plane with a pair of apertures 55 in which the shells 43 of the rear pair of bearings 41 are fitted and secured in any suitable manner as by the welds 56. It will be seen that the bucket seat 5 can readily be removed from its supporting linkage as above described by removing the bolts 54 which secure the plate 53. This plate 53, by detaching bolts 69 and pins 65, together with its bearings 41, can then be removed rearwardly from the rear fulcrum pins 40 formed by the fulcrum rods 38 whereupon the bucket seat 5 together with its supporting plate 48 can be slipped forwardly so as to remove the front pair of bearings 41 from the front fulcrum pins 40 formed by the fulcrum rods 38, this leaving the bucket seat 5 and its supporting plate 48 detached from the fulcrum rods 38.

The resilient support for the suspension is shown as being in the form of rubber torsion springs indicated generally at 60 and which are shown as secured to the fulcrum pins 40 provided by the ends of the fulcrum rods 38. Each of these torsion springs is shown as comprising a generally cylindrical body 61 of rubber having a flat outer face and a concave inner face, this rubber body being provided with an axial through bore 62 through which the corresponding fulcrum pin 40 extends. To the outer flat face of each rubber body 61 is vulcanized a disk 63 having a hub 64 which fits the extremity of the corresponding fulcrum pin 40 and can be secured thereto in any suitable manner as by the pin 65 shown. To the opposite concave face of each rubber body is vulcanized a convex metal plate 66, this plate having an outwardly projecting marginal flange 68 through which bolts 69 extend, three bolts 69 being shown for each rubber spring. At the front of the seat structure these bolts 69 secure the flanges 68 of the front pair of rubber springs 60 directly to the depending front flange 49 of the supporting plate 48 for the bucket seat or saddle 5. At the rear of the seat structure these bolts 69 secure the flanges 68 of the rear pair of rubber springs 60 to the plate 53 which is removably secured by the bolts 54 to the depending rear flange 50 of the supporting plate 48 for the bucket seat or saddle 5.

The seat elevation provided by the rubber springs 60 is preferably adjustable and for this purpose one of the bolts 69 of each rubber spring is shown as being capable of being inserted in one of a series of holes 70 provided in the flange 68 of each rubber spring and concentric with its axis. The other two bolts 69 of each rubber spring are shown as extending through arcuate slots 71 in this flange, these slots also being concentric with the axis of the rubber spring. Since the elevation of the seat determines the initial angularity of the crank arms 35 and hence their effective length, it will be seen that by selecting one or the other of the holes 70 for insertion of the corresponding bolt 69, the effective resistance of the rubber springs can be adjusted.

While a seat constructed as above described provides a satisfactory ride in the service for which it is designed, under certain conditions it is desirable to have further provision against undue tipping of the seat laterally. This can be accomplished by any suitable gearing connecting and compelling the fulcrum rods 38 to rotate in unison and as shown short crank arms 75, 75a are welded to the fulcrum rods 38 for this purpose. These short crank arms are shown as being in line with each other and the one crank arm 75 is shown as projecting upwardly from its fulcrum rod 38 while the crank arm 75a is shown as projecting downwardly from its fulcrum rod 38, these short crank arms being arranged parallel with each other and normally arranged at an angle to the horizontal. Each of these short crank arms 75, 75a is shown as provided with a crank pin in the form of a bolt 76, the two bolts being connected together by a pair of links 78 which straddle the short crank arms 75, 75a. Any suitable form of bearing, indicated generally at 79, can be provided between each short crank arm 75, 75a and its crank pin 76, the free end of each short crank arm 75, 75a for this purpose being apertured to receive the cylindrical shell 80 for a bearing bushing 81 which is preferably of lubricant impregnated material. Each shell 80 is preferably welded to the corresponding short crank arm 75, 75a, as indicated at 82, and dust seals in the form of rubber rings 83 are preferably interposed between each end of each bearing 79 and the corresponding link 78. It will be seen that the short crank arms 75, 75a and links 78 compel the fulcrum rods 38 and their crank arms 35 to rotate in unison, and since each pair of crank arms is connected by a shackle structure 21 with the corresponding side of the base 6, it will be seen that any substantial degree of lateral tipping of the seat part of the seat structure is prevented.

It has also been found desirable to provide a bumper to limit the downward movement of the seat part of the structure relative to the base part 6 thereof. This bumper can be of any suitable form and is shown as comprising an inverted U-shaped pedestal 85 arranged centrally on the bottom 8 of the base 6 and having its legs welded thereto. At its upper end a rubber bumper 86 is suitably secured thereto. The height of the pedestal 85 is designed so that when an extreme jolt is encountered the bumper 86 will engage the bottom of the supporting plate 48 for the bucket seat or saddle 5.

While separate shock absorbing means have not been found necessary, a shock absorber can readily be incorporated in the structure. Thus, a hydraulic shock absorber 90 is shown as having its body 91 secured to the underside of the supporting plate 48 for the bucket seat or saddle 5 and as having its operating arm 92 connected by a ball-and-socket jointed link 93 with a pin 94 secured to a lug 95 welded to the bottom 8 of the base part 6 of the seat structure.

In the operation of the suspension, which is shown in its normally loaded condition, the upward movement of the base part 6, through the shackles 22, swings the outer ends of the crank arms 35 upwardly, the fulcrum rods 38 of these crank arms oscillating about their bearings 41 which are fast to the removable plate 53 and U-shaped supporting plate 48 which carry the bucket seat or saddle 5. The rotation of each fulcrum rod 38 is yieldingly resisted by the pair of rubber springs 60 connected to the ends 40 thereof, this movement of each fulcrum rod 38 being transmitted from each of its ends 40 to the outer end of the corresponding rubber body 61 through the pin 65, hub 64, and disk 63 vulcanized to the outer end of the rubber body. The other end of each rubber body 61 is anchored through the convex plate 66 vulcanized to its inner face and bolts 69 to the seat part of the seat structure. In front the flanges 68 of these anchoring plates 66 of the rubber springs are bolted by the bolts 69 directly to the depending front flange 49 of the U-shaped supporting plate 48 which carries the bucket seat or saddle 5 and in rear the flanges 68 of these anchoring plates 66 of the rubber springs are bolted by the bolts 69 in the removable plate 53 which is secured by the bolts 54 to the depending rear flange 50 of this U-shaped supporting plate. The height of the seat can be adjusted by using the corresponding bolt hole 70 for the uppermost anchoring bolt 69 of each rubber torsion spring. Extreme jolts cause the U-shaped supporting plate 48 to bottom on the rubber bumper 86 carried by the pedestal 85 rising from the bottom 8 of the base 6.

Lateral tipping of the bucket seat or saddle 5 is prevented by the linkage interconnecting the fulcrum rods 38. Thus these fulcrum rods and the crank arms 35 connected therewith are compelled to oscillate in unison through the short crank arms 75, 75a and links 78 interconnecting these fulcrum rods 38. Since the crank arms 35 at each side of the seat structure are connected by the shackle structures 21 with the corresponding sides of the base 6, it will be seen that the bucket seat or saddle 5 is prevented from tipping laterally.

At the same time the bucket seat or saddle 5 is capable of lateral movement and this movement is resisted by lateral cushioning. This lateral movement of the bucket seat or saddle 5 is permitted by the shackles 22 which, it will be noted, extend upwardly and inwardly from the crank arm pivots 19 to the base pivots 18. This upward and inward inclined arrangement of these shackles tends to cause the bucket seat or saddle 5 to centralize itself in a direction transverse of the vehicle and enables the action of gravity to geometrically and resiliently resist any such movement of the bucket seat or saddle 5 away from its centered position. This permits the bucket seat or saddle 5 to move substantially straight ahead despite a certain amount of lateral movement of the vehicle and base 6 connected therewith.

When the base 6 is so forced upwardly relative to the bucket seat or saddle 5, the effective opposing force of the rubber torsion springs 60 increases at a geometric rate and not at an arithmetic rate. In this particular case the geometric rate is of the accelerated increase type in which increments of vertical movement of the base 6 are opposed by an accelerated rate of resilient resistance. This is primarily due to the progressive increase in the effective leverage of the crank arms 35 as they swing upwardly and outwardly about their axes of rotation. This action is caused by the angularity of the shackles 22 and the fact that increments of vertical displacement of the pivot pins 19 cause accelerated rates of increase in the angular displacement of the rubber torsion springs 60. This latter is due to the fact that increments of vertical movement of said pivot pins 19 are not proportional to the accompanying increments of angular twist to which the rubber torsion springs 60 are subjected.

This geometric action also occurs when the base 6 moves downwardly relative to the bucket seat or saddle 5. Throughout this particular movement the geometric action is of the accelerated decrease type, that is, as the base 6 passes through increments of downward movement the rate of decrease of the resilient force tending to push the bucket seat or saddle 5 downwardly decreases.

By this means, so far as vertical forces are concerned, the bucket seat or saddle 5 is free to "float" along solely under the influence of gravity (plus whatever vertical momentum forces are present), this feature being of particular significance when it is realized that the occupant is also, at this time, solely under the influence of gravity (plus whatever vertical momentum forces are present). The consequence is, that within a particular range of movement the occupant of the seat moves vertically up and down with the same acceleration and deceleration as the seat and hence without changing the pressure between the occupant and the seat. Such a desirable result is quite different from that obtained from conventional seat suspensions in which the vehicle drags or jerks the seat down whenever the strains imposed on the seat are negative. With the present suspension no such dragging forces pulling the seat downwardly are possible.

It will also be noted that the present invention provides resilient support for the bucket seat or saddle 5 in the form of simple and sturdy rubber torsion springs which can be produced at low cost and are secured both to the base of the seat structure and also to the crank arms of the suspension in a simple and effective manner and in position where they are readily accessible. Further, the suspension as a whole can be readily designed to have any desired characteristics within an operative range. Thus, any desired resistance curve can be obtained by making the crank arms 35 of a corresponding length and any desired frequency can be obtained by selecting a rubber spring 60 of such diameter as to provide the angular crank arm movement to provide such desired frequency. The use of the rubber springs 60 of the form shown and in relation to the crank arms 35 provides this ability to provide any desired spring rate and resistance curve in a very simple and inexpensive seat suspension.

It will also be seen that full advantage is taken throughout of simple and inexpensive welded joints and that at the same time the suspension can be taken apart into simple sub-assemblies which can be replaced at low cost. Thus each rubber spring 60 can be removed by the simple expedient of removing its pin 65 and bolts 69. The bucket seat or saddle 5 can readily then be removed by moving the parts 50, 48, 49 forwardly off the rods 38. The crank arm structures 35, 38 and the shackle structures 21 can then be removed by removing the nuts 32 and freeing the shackles 22 from the crank arm pivot pins 19 and base pivot pins 18. Any one of these sub-assemblies can be replaced at low cost.

It will also be noted that these sub-assemblies provide a sturdy and easily assembled seat structure which adequately resists the forces imposed thereon from all directions.

From the foregoing it will be seen that the present invention provides a seat suspension which is particularly applicable to rough riding vehicles or vehicles subject to excessive lateral movement such as farm tractors, locomotives and military vehicles in that it provides controlled vertical and lateral cushioning in such manner as to provide the maximum safety and comfort and leave the occupant in full control of all control levers and wheels. The seat suspension is also simple, rugged and not subject to breakdown or loss of utility and can be produced at low cost.

I claim:

1. A spring suspension for connecting the seat part and base part of a seat structure and comprising a pair of crank arms, a pair of axially spaced fulcrum bearings between said crank arms and one of said parts and fixed in said one of said parts, a rod fast to the outer end of said crank arms and arranged parallel with the axis of said bearings, a second rod fast to the other of said parts and arranged parallel with said first rod, a pair of shackles each arranged at adjacent ends of said first and second rods and having a pair of cup-shaped bearings at its opposite ends fitting over the corresponding ends of the rods, means holding said shackles together, and means extending through said first named bearings resiliently restraining rotation of said crank arms.

2. A spring suspension for connecting the seat part and base part of a seat structure and comprising a pair of crank arms, a pair of axially spaced fulcrum bearings between said crank arms and one of said parts and fixed in said one of said parts, a rod fast to the outer end of said crank arms and arranged parallel with the axis of said bearings, a second rod fast to other of said parts and arranged parallel with said first rod, a pair of shackles each arranged at adjacent ends of said first and second rods and having a pair of cup-shaped bearings at its opposite ends fitting over the corresponding ends of the rods, a tie rod connecting said shackles releasably and holding said shackles together, and means extending through said first named bearings resiliently restraining rotation of said crank arms.

3. A spring suspension for connecting the seat part and base part of a seat structure and comprising a rod fast to one of said parts, a fulcrum rod arranged parallel with said first rod and journaled in spaced bearings provided on the other of said parts, a crank arm fast to said fulcrum rod, a crank arm rod fast to the outer end of said crank arm and arranged parallel with said other rods, a pair of shackles each arranged at adjacent ends of said first rod and said crank arm rod and having a pair of cup-shaped bearings at its opposite ends fitting over the corresponding ends of said first rod and said crank arm rod, means removably holding said shackles together, and means resiliently restraining rotation of said fulcrum rod.

4. A spring suspension for connecting the seat part and base part of a seat structure and comprising a pair of horizontal fulcrum rods arranged in spaced relation to each other, a first pair of bearings mounted on one of said parts and journaling corresponding ends of said fulcrum rods, a plate arranged generally perpendicularly to said fulcrum rods at the ends thereof opposite said first pair of bearings, means detachably securing said plate to said one of said parts, a pair of bearings mounted on said plate and journaling the ends of said fulcrum rods opposite said first pair of bearings, a crank arm fast to each of said fulcrum rods and projecting in opposite directions from each other, said crank arms in the normally loaded condition of said suspension being horizontally arranged, shackles pivotally connecting the outer ends of said crank arms with the other of said parts, a pair of torsion springs anchored on said plate and each operatively connected to said end of each of said fulcrum rods opposite said first pair of bearings, and a second pair of torsion springs anchored on said one of said parts and each operatively connected to said corresponding end of each of said fulcrum rods, said torsion springs resiliently restraining rotation of said fulcrum rods.

5. A spring suspension for connecting the seat part and base part of a seat structure and comprising a transverse flange projecting downwardly from the front of said seat part, a transverse flange projecting downwardly from the rear of said seat part, a plate removably secured to a face of one of said flanges, a pair of transversely spaced bearings in said plate, a pair of transversely spaced bearings in the other of said flanges each in line with a companion bearing in said plate, a fulcrum rod journaled in each companion pair of said bearings, a crank arm fast to each of said fulcrum rods and projecting horizontally outwardly therefrom in the normally loaded condition of said suspension, a shackle pivotally connecting the outer end of each of said crank arms with said base part, and means resiliently restraining rotation of said crank arms comprising a pair of rubber bodies removably anchored on said plate each in alinement with one of said fulcrum rods, means connecting each of said rubber bodies with the corresponding end of said fulcrum rod, a second pair of rubber bodies removably anchored on said other of said flanges each in alinement with one of said fulcrum rods, and means connecting each of said second pair of rubber bodies with the corresponding end of said fulcrum rod.

6. A spring suspension for connecting the seat part and base part of a seat structure and comprising two generally parallel fulcrum rods arranged fore-and-aft of said seat part and adjacent to each other, crank arms severally fast to said fulcrum rods and normally projecting under load horizontally outwardly away from each other in a direction transverse of said seat part, a pair of bearings spaced from each other fore-and-aft of said seat part and connecting each of said fulcrum rods to one of said parts, a shackle structure at each side of the seat structure, a pair of bearings spaced from each other fore-and-aft of said seat structure and pivotally connecting one end of each of said shackle structures with the outer end of the corresponding crank arm to swing about an axis extending generally parallel with said fulcrum rods, a pivotal connection between the other end of each of said shackle structures and the other of said parts to swing about an axis generally parallel with the other axes, a rubber body fixed to each of said fulcrum rods, and means adjustably securing said rubber bodies to said one of said parts thereby to restrain movement of said parts toward each other.

7. A spring suspension for connecting the seat part and base part of a seat structure and comprising a unitary seat bracket member fast to said seat part and providing a vertical transverse plate projecting downwardly from the front end of said seat part and a second vertical transverse plate projecting downwardly from the rear end of said seat part and secured to said bracket, a pair of generally horizontal fulcrum rods journalled at their opposite ends in said plates to extend fore-and-aft of said seat structure and arranged adjacent to each other, crank arms severally fast to said fulcrum rods and normally extending outwardly away from each other in a direction transverse of said seat part to provide a pair of crank arm structures on opposite sides of the seat structure, shackle structures at each side of the seat structure, pairs of bearings spaced from each other fore-and-aft of said seat structure and each bearing pivotally connecting one end of each of said shackle structures with the outer end of the corresponding crank arm structure to swing about an axis extending generally parallel with said fulcrum rods, a pivotal connection between the other end of each of said shackle structures and said base part and extending generally parallel with said fulcrum rods, means interconnecting said fulcrum rods to oscillate in unison, and a rubber body fixed to at least one of said fulcrum rods and to one of said plates and resiliently restraining oscillation of said crank shafts.

8. A spring suspension for connecting the seat part and base part of a seat structure and comprising, a transverse plate fast to and projecting downwardly from the front end of said seat part, a second transverse plate fast to and projecting downwardly from the rear end of said seat part, a plate removably secured to one of said transverse plates in generally parallel relation with the other plate, a pair of generally horizontal fulcrum rods journalled at their opposite ends in said removable plate and the other of said transverse plates and arranged to extend fore-and-aft of said seat structure and arranged adjacent to each other, crank arms severally fast to said fulcrum rods and normally extending outwardly away from each other in a direction transverse of said seat part to provide a pair of crank arm structures on opposite sides of the seat structure, shackle structures at each side of the seat structure, pairs of bearings spaced from each other fore-and-aft of said seat structure and each bearing pivotally connecting one end of each of said shackle structures with the outer end of the corresponding crank arm structure to swing about an axis extending generally parallel with said fulcrum rods, a pivotal connection between the other end of each of said shackle structures and said base part and extending generally parallel with said fulcrum rods, and means interposed between one of said plates and at least one of said fulcrum rods and resiliently restraining oscillation thereof.

9. A spring suspension for connecting the seat part and base part of a seat structure and comprising means providing a pair of coaxial pivot pins fixed to said base part adjacent the front and rear ends of the seat structure and extending fore-and-aft thereof, a pair of shackles severally pivoted at one end on said pivot pins, a pair of crank arms severally pivoted at corresponding ends to the other ends of said shackles, a bracket member including a fore-and-aft cross part fast to said seat part and a pair of generally vertical transverse plates arranged below said seat part adjacent the front and rear ends thereof, respectively, means fixing one of said plates to said cross part and means detachably securing the other of said plates to said cross part, a fulcrum rod fixedly joining the other ends of said crank arms and pivoted at its opposite ends in said plates, and a torsion spring connecting one end of said fulcrum rod with the corresponding one of said plates.

10. A spring suspension for connecting the seat part and base part of a seat structure and comprising means providing a pair of coaxial pivot pins fixed to said base part adjacent the front and rear ends of the seat structure, and sponding ends to the other ends of said shackles, severally pivoted at one end on said pivot pins, a pair of crank arms severally pivoted at corresponding ends to the other ends of said shackles, a supporting member depending from said seat part, a fulcrum rod fixedly joining the other ends of said crank arms and pivotally connected to said seat part and arranged adjacent said depending supporting member, a rubber body fixed to said fulcrum rod adjacent said depending member, an anchoring plate secured to said rubber body, and an adjustable connection between said anchoring plate and depending supporting member and arranged to secure said anchoring plate in different positions of rotation about the axis of said fulcrum rod and thereby adjust the height of the seat.

11. A spring suspension for connecting the seat part and base part of a seat structure and comprising means providing a pair of coaxial pivot pins fixed to each side of said base part adjacent the front and rear ends of the seat structure and extending fore-and-aft thereof, a pair of shackles at each side of said seat structure and severally pivoted at one end on said pivot pins, a pair of crank arms at each side of said seat structure and severally pivoted at corresponding ends to the other ends of said shackles, a pair of supporting members depending from said seat part, a fulcrum rod extending fore-and-aft of said seat structure and arranged at each side of said seat structure and fixedly joining the other ends of each pair of said crank arms and pivotally connected to said depending supporting members, a rubber body fixed to each of said fulcrum rods adjacent a corresponding one of said supporting members, an anchoring plate secured to each rubber body, and an adjustable connection between each anchoring plate and the corresponding depending supporting member and arranged to secure each anchoring plate in different positions of rotation about the axis of the corresponding fulcrum rod and thereby adjust the height of the seat.

12. A spring suspension for connecting the seat part and base part of a seat structure and comprising means providing a pair of coaxial pivot pins fixed to each side of said base part adjacent the front and rear ends of the seat structure and extending fore-and-aft thereof, a pair of shackles at each side of said seat structure and severally pivoted at one end on said pivot pins, a pair of crank arms at each side of said seat structure and severally pivoted at corresponding ends to the other ends of said shackles, a pair of depending supporting members secured to the front and rear ends of said seat part, a fulcrum rod extending fore-and-aft of said seat structure and arranged at each side of said seat structure and fixedly joining the other ends of said crank arms, pairs of alined bearings carried by said depending supporting members and in which said fulcrum rods are journalled, said crank arms being arranged between said alined bearings, corresponding ends of said fulcrum rods projecting through the corresponding one of said depending supporting members, and an outboard rubber body fixed to each of said projecting ends of each of said fulcrum rods and anchored to an adjacent part of said one of said depending supporting members.

13. A spring suspension for connecting the seat part and base part of a seat structure and comprising means providing a pair of coaxial pivot pins fixed to each side of said base part adjacent the front and rear ends of the seat structure and extending fore-and-aft thereof, a pair of shackles at each side of said seat structure and severally pivoted at one end on said pivot pins, a first rod at each side of said seat structure and pivoted adjacent its opposite ends in the other ends of said shackles, a pair of crank arms at each side of said seat structure and fixed to opposite ends of the corresponding rod adjacent said shackles, a pair of fulcrum rods each extending parallel with one of said first rods and arranged at each side of said seat structure and fixedly joining the other ends of each pair of said crank arms, pivotal connections between said fulcrum rods and said seat part, and torsion spring means interposed between at least one of said fulcrum rods and said seat part and yieldingly resisting rotation thereof, the said first rod, pair of crank arms and fulcrum rod at each side of the seat structure forming a unitary rectangular box yoke connecting the seat part with the shackles.

14. A spring suspension for connecting the seat part and base part of a seat structure and comprising means providing a pair of coaxial pivot pins fixed to each side of said base part adjacent the front and rear ends of the seat structure and extending fore-and-aft thereof, a pair of shackles at each side of said seat structure and severally pivoted at one end on said pivot pins, a pair of crank arms at each side of said seat structure and severally pivoted at corresponding ends to the other ends of said shackles, a pair of depending supporting members secured to the front and rear ends of said seat part, a fulcrum rod extending fore-and-aft of said seat structure and arranged at each side of said seat structure and fixedly joining the other ends of said crank arms, pairs of alined bearings carried by said depending supporting members and in which said fulcrum rods are journalled, a rubber body fixed to each of said fulcrum rods and anchored to an adjacent part of said one of said depending supporting members, and a cushioned stop on the base part limiting the downward movement of said seat part toward said base part.

ALBERT F. HICKMAN.

REFERENCES CITED

The following references are of record in the file of this patent:

UNITED STATES PATENTS

| Number | Name | Date |
|---|---|---|
| 870,692 | Shepard | Nov. 12, 1907 |
| 2,080,969 | Macbeth | May 18, 1937 |
| 2,361,226 | Miner | Oct. 24, 1944 |

FOREIGN PATENTS

| Number | Country | Date |
|---|---|---|
| 772,751 | France | of 1934 |